3,114,738
HOMOPOLYMERIZATION OF VINYL ACETATE
WITH A CATALYST OF MERCURIC ACETATE
Tsugio Kominami and Saburo Imoto, Toyama City, Japan, assignors to Kurashiki Rayon Co., Ltd., a corporation of Japan
No Drawing. Filed Sept. 12, 1960, Ser. No. 55,168
1 Claim. (Cl. 260—89.1)

This invention relates to the polymerization of vinyl acetate to form polyvinyl acetate, and is more particularly concerned with the use of a novel polymerization catalyst.

Vinyl acetate is conveniently polymerized to polyvinyl acetate by the use of a peroxide or an azo compound as the catalyst, as described, for example, in Cline et al. U.S. Patent No. 2,610,360. In general, polymerization with such catalysts is carried out at temperatures above room temperature.

It is an object of the present invention to provide a novel catalyst fully effective to polymerize vinyl acetate at room temperature.

It is another object of the invention to provide a novel process for polymerizing vinyl acetate at room temperature with small amounts of catalyst.

In accordance with the invention, vinyl acetate is polymerized in the presence of a small amount of mercuric acetate as the catalyst. With this catalyst, the polymerization of vinyl acetate can be effectively and efficiently carried out at room temperature to produce polymers having desired degrees of polymerization. While the amount of catalyst may vary, 0.05 to 0.2 mol percent of mercuric acetate, based on the vinyl acetate to be polymerized, has been found to be particularly effective. With this catalyst, polymerization proceeds smoothly at room temperature, e.g. 25 to 28° C., and it has been found that the presence of a small amount of water, e.g. an amount ranging from about 0.1% to about 3% by weight of the mercuric acetate employed, has a surprising accelerating effect upon the polymerization reaction. Mercuric acetate will form a mercury addition compound with vinyl acetate and it is believed that the activity of mercuric acetate as a catalyst is due to a free radical mechanism upon the decomposition of the mercury addition compound, this being particularly so when a small amount of water is present. Without intending to limit the invention in any way, the following sequence of reactions is suggested as one possible explanation of the action of mercuric acetate as a particularly effective polymerization catalyst for vinyl acetate.

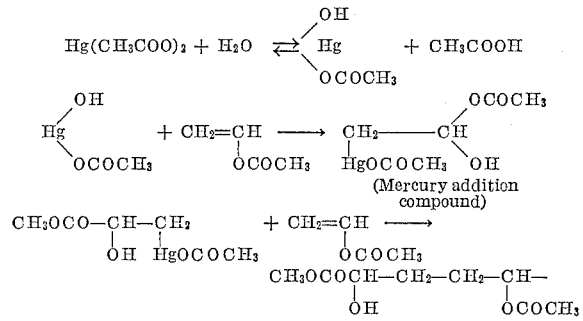

When the thus produced polyvinyl acetate is saponified, a carbonyl radical will be formed as follows:

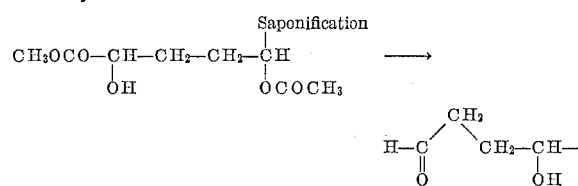

The nature and features of the invention will be further apparent from the following specific examples of practical application. However, it will be understood that these examples are not to be construed as limiting the scope of the present invention in any manner. In the examples, all parts are by weight unless otherwise indicated.

In each of the following examples, a polymerization solution having the composition of monomer, solvent, and catalyst indicated was charged to a polymerization tube and the air above the solution was replaced by nitrogen. Polymerization was then carried out by allowing the tubes to stand for the period of time and at the temperature specified in each example. The polymer obtained in each case was colorless and when the polymer was saponified in conventional manner with sodium hydroxide, as described in Bristol U.S. Patent No. 2,700,035, colorless polyvinyl alcohol was produced. The percent of vinyl acetate polymerized (conversion or percentage polymerization) and the degree of polymerization of the polymer produced are specified in each case. In accordance with common usage, the term "degree of polymerization" means the average number of monomer units per polymer molecule and is, of course, a measure of molecular weight. It is determined by conventional methods such as the well-known viscosity method.

*Example 1*

| | |
|---|---|
| Vinyl acetate | 85 parts. |
| Anhydrous methanol | 15 parts. |
| Mercuric acetate | 0.65 part. |
| Polymerization temperature | Room temperature (25 to 28° C.). |
| Polymerization time | 4 days. |
| Conversion | 38%. |
| Degree of polymerization | 1530. |

*Example 2*

| | |
|---|---|
| Vinyl acetate | 85 parts. |
| Hydrous (0.5%) methanol | 15 parts. |
| Mercuric acetate | 0.75 part. |
| Polymerization temperature | Room temperature (25 to 28° C.). |
| Polymerization time | 22 hours. |
| Conversion | 48.5%. |
| Degree of polymerization | 1875. |

*Example 3*

| | |
|---|---|
| Vinyl acetate saturated with water at room temperature | 100 parts. |
| Mercuric acetate | 0.54 part. |
| Polymerization temperature | Room temperature (25 to 28° C.) |
| Polymerization time | 28 hours. |
| Conversion | 39%. |
| Degree of polymerization | 5130. |

While methanol has been used as the solvent in the foregoing examples, it will be understood that other solvents which are liquid at polymerization temperatures and which are free from active hydrogen atoms such as those conventionally employed in the polymerization of vinyl acetate can be substituted for methanol. The choice of a solvent for the polymerization is not critical. It is only necessary that the solvent be one which dissolves the polymer, e.g. to the extent of at least 5%, as well as the monomer, that it be unpolymerizable under the reaction conditions, and that it be essentially chemically inert toward the vinyl acetate and the catalyst. Suitable solvents include hydrocarbons such as toluene, xylene, cyclohexane; alcohols such as ethanol, isopropyl alcohol or butanol; ether-alcohols such as methoxyethanol; ketones such as acetone; esters such as methyl acetate, ethyl acetate or butyl acetate; heterocyclics such as tetrahydrofuran, etc. The preferred solvents are the alkanols of 1 to 4 carbon atoms. Mixed solvents may also be used.

It will be understood that, unless otherwise indicated, conventional polymerization techniques used in the polymerization of vinyl esters are employed in carrying out the polymerization process of the present invention and that conventional polymerization equipment suited to the conditions of polymerization is employed. The polyvinyl esters produced by the process of this invention are particularly suitable for conversion to polyvinyl alcohol by any of the known saponification procedures, which polyvinyl alcohol may be used to form fibers or filaments, also by conventional methods. In connection with the conventional techniques and methods, reference is suitably made to Cline et al. U.S. Patent 2,610,360.

The conditions and relative relationships set forth above are those preferred in carrying out the process of the invention but it will be understood that other conditions and relationships may be used within the scope of the invention.

It will thus be understood that various changes and modifications may be made without departing from the scope of the invention as defined in the appended claim and it is intended, therefore, that all matter contained in the foregoing description shall be interpreted as illustrative only and not as limitative of the invention.

We claim:

A process of producing homopolymers from vinyl acetate which comprises homopolymerizing said vinyl acetate in a system selected from the group consisting of bulk and inert solvent systems at room temperature and atmospheric pressure in the presence of water and a catalyst consisting solely of 0.05 to 0.2 mol percent of mercuric acetate based on said vinyl acetate, the amount of water being not less than 0.1 percent of the weight of mercuric acetate and not more than the amount which dissolves in vinyl acetate at room temperature.

References Cited in the file of this patent

UNITED STATES PATENTS

| | | |
|---|---|---|
| 2,380,474 | Stewart | July 31, 1945 |
| 2,402,484 | Adelson et al. | June 18, 1946 |
| 3,002,953 | Sixt | Oct. 3, 1961 |